US006089080A

United States Patent [19]

Takaku et al.

[11] Patent Number: 6,089,080

[45] Date of Patent: Jul. 18, 2000

[54] DIAGNOSIS APPARATUS FOR EVAPORATION SYSTEM

[75] Inventors: Yutaka Takaku; Toshio Ishii, both of Mito; Kazuya Kawano, Hitachinaka, all of Japan

[73] Assignee: Hitachi, Ltd., Tokyo, Japan

[21] Appl. No.: 08/990,411

[22] Filed: Dec. 15, 1997

[30] Foreign Application Priority Data

Dec. 13, 1996 [JP] Japan .................................... 8-333949

[51] Int. Cl.[7] ........................................................ G01L 3/26

[52] U.S. Cl. ............................. 73/117.3; 73/116; 123/520

[58] Field of Search .................................... 73/118.1, 116, 73/117.3; 123/520

[56] References Cited

U.S. PATENT DOCUMENTS 5,651,351 7/1997 Matsumoto et al. .................... 123/520
5,679,890 10/1997 Shinohara et al. ..................... 73/118.1
5,680,849 10/1997 Morikawa et al. ..................... 123/520
5,765,539 6/1998 Isobe et al. ............................. 123/520
5,765,540 6/1998 Ishii et al. ............................... 123/520

*Primary Examiner*—Max Noori
*Attorney, Agent, or Firm*—Evenson, McKeown, Edwards & Lenahan, P.L.L.C.

[57] ABSTRACT

A diagnosis apparatus for an evaporation system, and particularly, in an evaporation system having a gauge valve in the evaporation system without being affected by a change in internal pressure of the evaporation system, a residual amount of fuel in a fuel tank and an atmospheric density. The diagnosis apparatus is capable of precisely diagnosing the evaporation system even in the case where dirt or stain or the like adheres to the gauge valve and an air cleaner. A gauge pipe is branched between a fuel tank and a purge valve and opened to an intake pipe or atmosphere, and a gauge valve is arranged in the gauge pipe. A state detector is provided for detecting the state of a gauge system comprising the gauge valve and the gauge pipe, and a correcting feature corrects the results of diagnosis by abnormality determination apparatus on the basis of the results of detection by the state detector.

6 Claims, 7 Drawing Sheets

DIAGNOSIS APPARATUS FOR EVAPORATION SYSTEM

This application claims the priority of Japanese patent application 8-333949, the disclosure of which is expressly incorporated by reference herein.

BACKGROUND OF THE INVENTION

The present invention relates to a diagnosis apparatus for an evaporation system, and particularly, to an apparatus for precisely diagnosing a leak of evaporation gas in the evaporation system in which an evaporation gas (evaporation fuel) generated in a fuel tank is adsorbed in an adsorbent within a canister, and the adsorbed fuel is purged into an intake system of an internal combustion engine under the predetermined operating conditions for combustion.

The conventional evaporation system for an engine has the airtight construction in order to prevent the evaporation gas from being purged into the atmosphere. However, in the case where the passage for the evaporation gas in the evaporation system is broken or the pipe is disconnected for some reasons, the evaporation gas in the canister becomes purged into the atmosphere. Further, also in the case where the purge passage connected to the intake pipe of the engine or the like becomes clogged, this obstructs the purge of the evaporation gas.

It is necessary for coping with the inconvenience of the evaporation system to diagnose in advance the presence or absence of generation of troubles of the evaporation system. In the technique disclosed in Japanese Patent Laid-Open No. Hei 6-193518, intake negative pressure is taken into the evaporation system through the purge valve, the pressure change of the evaporation system is detected by a pressure sensor, and the trouble of the evaporation system is detected and diagnosed on the basis of the pressure change.

Further, Japanese Patent Laid-Open No. Hei 6-249095 discloses the diagnosis by a pressure sensor for detecting pressure of a fuel tank. Inspection of a liquid quantity of the fuel tank is executed, and a duty ratio of vent valve control of the tank is decided on the basis of fuel obtained. Thereafter, the vent valve is opened and the cutoff valve is closed at the decided duty ratio, and the diagnosis of a leak of the evaporation gas is carried out from a negative pressure reducing gradient of negative pressure which reduces in the tank.

In the technique for introducing negative pressure into the evaporation system to diagnose the evaporation system according to the pressure change thereof, as in the conventional diagnosis of the evaporation system as described above, the pressure change in the evaporation system is affected by the residual quantity of fuel in the fuel tank (relating to the space volume), the atmospheric density (which changes with the altitude or the like) or the like, resulting in an error of detection. The present applicant has already proposed diagnosis apparatuses in which a gauge valve is arranged in an evaporation system for precisely performing diagnosis without being affected as described above (see Japanese Patent Laid-Open No. Hei 8-35452/U.S. Pat. No. 5,575,265 and Japanese Patent Laid-Open No. Hei 9-203352). In these proposals, the pressure change is changed to a pressure change in an evaporation system in the state where a gauge valve is opened and closed and the gauge valve having a predetermined vent area is opened or a pressure change in an evaporation system in the state where the gauge valve is closed to thereby cancel the aforementioned influence to precisely perform the diagnosis of the evaporation system.

However, the diagnosis apparatus using the gauge valve as described above has a problem in that if stain or the like should adhere to the gauge valve to reduce the vent area, an error would occur in the result of diagnosis.

Further, it is assumed that an opening of a gauge pipe is at the atmospheric pressure. However, for example, in the case where the gauge pipe is communicated with an intake pipe of the engine, when stain or the like adheres to an air cleaner to generate the pressure loss, an error also occurs in the result of diagnosis.

The present invention has been accomplished in view of the problem as described above. It is an object of the present invention to provide a diagnosis apparatus for an evaporation system in which even if stain adheres to a gauge valve of the evaporation system or an air cleaner for intake air, the diagnosis of the evaporation system can be carried out precisely.

SUMMARY OF THE INVENTION

For achieving the aforementioned object, a diagnosis apparatus for an evaporation system according to the present invention comprises a fuel tank, a canister for introducing evaporation gas generated in the fuel tank through an evaporation pipe and accommodating an adsorbent for temporarily adsorbing the evaporation gas, a purge pipe having a purge valve for purging the adsorbed evaporation gas to an intake pipe of an engine, a pressure sensor arranged in the evaporation pipe, and a control device provided with means for determining abnormality such as a leak of the evaporation gas on the basis of a pressure detection signal of the pressure sensor, the evaporation system comprising a gauge pipe branched between the fuel tank and the purge valve and opened to the intake pipe or the atmosphere, and a gauge valve arranged on the gauge pipe, the control device comprising state detection means for detecting the state of a gauge system comprising the gauge valve and the gauge pipe, and correction means for correcting results of diagnosis by the abnormality determination means on the basis of results of detection by the state detection means.

According to a specific embodiment of the diagnosis apparatus for the evaporation system of the present invention, the state detection means detects a vent area of the gauge valve, and detects the vent area of the gauge valve on the basis of pressure in the evaporation system corresponding to an operating state of the gauge valve.

Further, the state detection means detects pressure at an opening of the gauge pipe, and detects pressure at the opening of the gauge pipe on the basis of pressure in the evaporation system in an open state of the gauge valve.

In the diagnosis apparatus for the evaporation system according to the present invention constituted as described above, a purge valve, a bypass valve, a drain valve, and a gauge valve are operated, pressure in the evaporation system is detected by a pressure gauge, and the abnormality determination means obtains a leak area from the pressure and a sectional area Ag of a gauge orifice, and if the leak area is in excess of a predetermined valve (a leak determination threshold), diagnosis is made that it is abnormal.

In the diagnosis by the state detection means of the gauge system, the drain valve and the gauge valve are closed, and the purge vale is opened to lower pressure of the evaporation system to a predetermined value. Thereafter, the purge valve is closed, and a change of pressure is measured by a pressure sensor. In the case where determination is made that the pressure change exceeds a predetermined valve, determination is made that there is a leak in excess of a predetermined value in the evaporation system. In the case where determination is made that the pressure change is a predetermined value or below, the gauge valve is opened, after which the pressure change is measured. The purge valve, the bypass valve, the drain valve, and the gauge valve are operated to measure pressure of the pressure change when the gauge valve is closed and pressure of the pressure change when the gauge valve is opened. The pressures of these two pressure changes are used to compute a sectional area computed value Ag' of a gauge orifice. Thereafter, determination is made whether the sectional area computed value Ag' of the gauge orifice is within the predetermined range. If within the predetermined range, the normal diagnosis of the evaporation system is carried out. If the sectional area computed value Ag' of the gauge orifice is large beyond the predetermined range or small, this is not suitable for the diagnosis of the evaporation system, and therefore, the diagnosis of the evaporation system is inhibited.

Next, in the correction means, the sectional area computed value Ag' of the gauge orifice is used instead of a sectional area Ag of the gauge orifice, the leak area is computed. Thus, even if stain or the like adheres to the gauge valve or the like to reduce the vent area, a proper leak area is obtained.

As described above, in the diagnosis apparatus for the evaporation system according to the present invention, in the case where stain adheres to the gauge valve of the evaporation system, the air cleaner for intake air or the like, such a state is detected by the state detection means of the gauge system, and the results of the normal diagnosis of the system can be corrected by the correction means on the basis of the results of detection.

DESCRIPTION OF THE PREFERRED EMBODIMENTS

One embodiment of an engine control unit according to the present invention will be described hereinafter with reference to the drawings.

Figure 1:
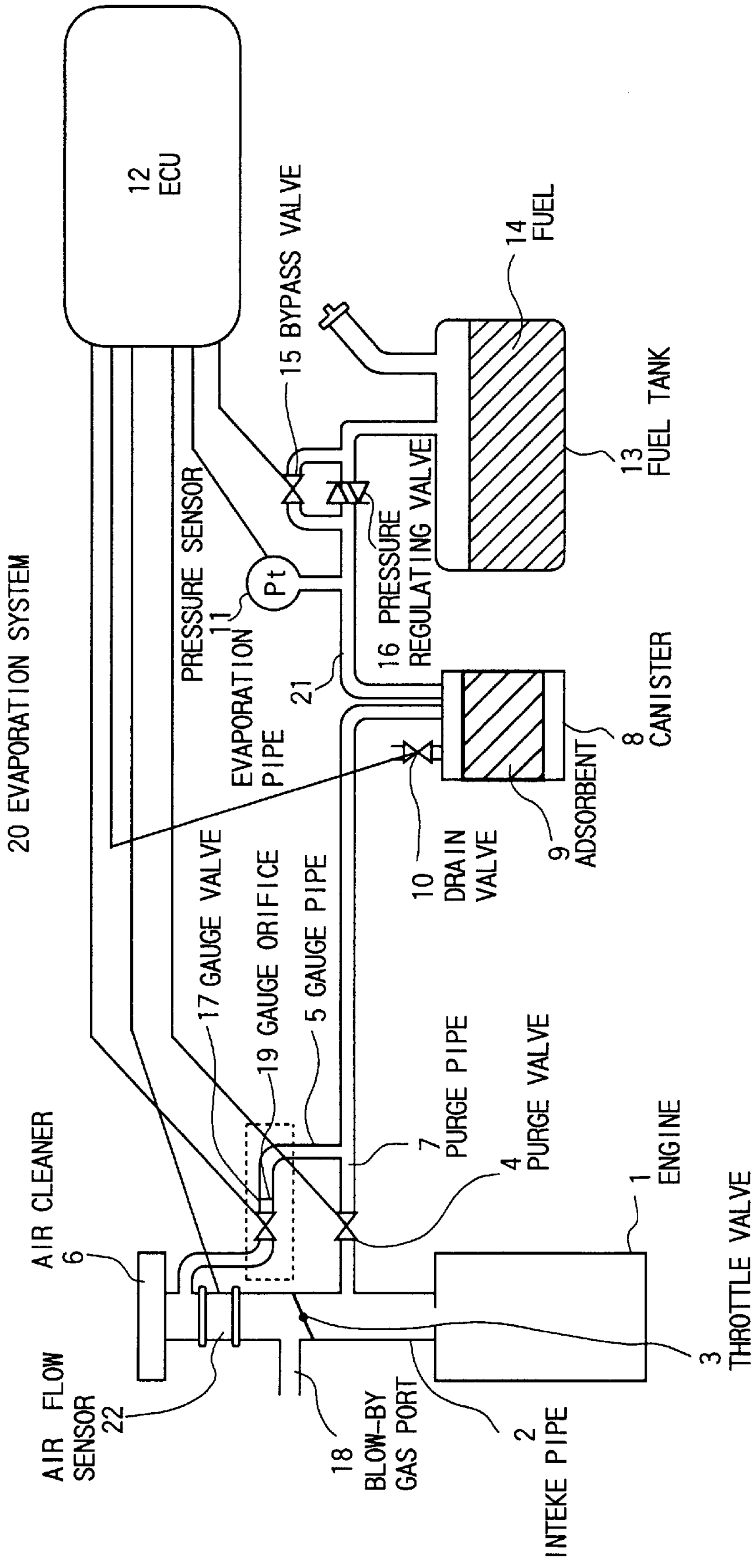
FIG. 1 is an entire constitutional view of a diagnosis apparatus for an evaporation system according to one embodiment of the present invention.

FIG. 1 is an entire constitutional view of a diagnosis apparatus for an evaporation system 20 according to the present embodiment. An intake pipe 2 connected to an engine 1, a control unit (ECU) 12, a canister 8, a fuel tank 13 and the like are arranged in the evaporation system 20, and air taken in from the air cleaner 6 is supplied to the engine 1 through the intake pipe 2.

Evaporation fuel (evaporation gas) evaporated from fuel 14 within the fuel tank 13 is adsorbed by an adsorbent 9 within the canister 8 through an evaporation pipe 21, and the adsorbed fuel is purged into the intake pipe 2 at a downstream of a throttle valve 3 of the engine 1 through a purge pipe 7 and guided to the engine 1 together with the air taken in for combustion. The purge pipe 7 is provided with a purge valve 4 to control the purge timing of the evaporation gas and the purge quantity.

The fuel tank 13 and the canister 8 housing the adsorbent 9 therein are connected through a pressure regulating valve 16. The pressure regulating valve 16 is opened so as to adsorb the evaporation gas generated in the fuel tank 13 on the adsorbent 9 only when the pressure in the fuel tank 13 exceeds a predetermined value. The pressure regulating valve 16 includes, for example, the type which is opened and closed due to a differential pressure relative to atmospheric pressure, and the type which is opened and closed due to a differential pressure before and behind the pressure regulating valve 16. When the internal pressure of the fuel tank 13 exceeds a predetermined value (10 to 20 mmHg) with respect to the atmospheric pressure or the pressure on the canister 8 side of the pressure regulating valve 16, the pressure regulating valve 16 opens so that the evaporation gas generated in the fuel tank 13 flows to the adsorbent 9 in the canister 8 and is adsorbed thereon.

On the other hand, when the internal pressure of the fuel tank 13 is below a predetermined value (– a few mmHg) with respect to the atmospheric pressure or the pressure on the canister 8 side of the pressure regulating valve 16, the pressure regulating valve 16 opens so that the atmosphere is caused to flow into the fuel tank 13 whereby the interior of the fuel tank 13 is not excessive negative pressure.

A bypass valve 15 bypasses the pressure regulating valve 16, with respect to the evaporation system 20 thus formed, and opens and closes to directly connect the fuel tank 13 to the canister 8. A pressure sensor 11 provided on the evaporation pipe 21 is to detect pressure of the evaporation system 6, and a drain valve 10 of the canister 8 is installed a new air inlet (drain) portion of the canister 8 so as to cut introduction of new air from the drain. A gauge pipe 5 branched from the purge pipe 7 is provided to communicate the purge pipe 7 with the intake pipe 2 through a gauge orifice 19 and a gauge valve 17.

The ECU 12 comprises abnormality determination means, gauge system-state detection means and correction means to control the purge valve 4, the gauge valve 17, the drain valve 10, and the bypass valve 15. In the abnormality determination means, the pressure of the evaporation system 20 is measured and processed by the pressure sensor 11 to thereby diagnose the evaporation system 20. Further, the gauge system-state detection means detects whether or not the stain adheres to the gauge valve 17 or the air cleaner 6. The correction means compensates the diagnosis result of the evaporation system 20 on the basis of the detection result thereof.

The diagnosis apparatus for the evaporation system according to the above-described embodiment causes the gauge pipe 5 to communicate between the air cleaner 1 of the intake pipe 2 and an air flow sensor 22, but it may be the downstream of the air flow sensor 22. Preferably, it may be connected at the upstream from a blow-by gas port 18 so that the gauge orifice 19 embraced in the gauge valve 17 is refrained from clogging due to the blow-by gas or the like. The communication portion of the gauge pipe 5 may be directly purged to atmosphere through a filter. In short, preferably, the pressure of the communication portion of the gauge pipe 5 is substantially equal to the atmospheric pressure.

While in the above-described embodiment, the gauge pipe 5 is branched from the purge pipe 7, it is to be noted that the gauge pipe 5 may be branched from the evaporation pipe 21 or the fuel tank 13 according to the constitution of the evaporation system 20. Further, the position of the pressure sensor 11 is not limited to the position as described above.

In the normal operation of the engine 1, the gauge valve 17 and the bypass valve 15 are closed, and the drain valve 10 is opened. When the pressure of the evaporation gas generated in the fuel tank 13 exceeds a predetermined pressure, the pressure regulating valve 16 is opened so that the evaporation gas is adsorbed in the adsorbent 9 in the canister 8. When the purge valve 4 is opened according to the operating state of the engine 1, since the interior of the intake pipe 2 is negative pressure, air flows into the canister 8 through the drain valve 10 opened to the atmosphere, and the evaporation gas once adsorbed is disengaged from the adsorbent 9, carried to the intake pipe 2 through the purge pipe 7 and burned in the engine 1. Through the aforementioned process, the fuel evaporation (evaporation gas) generated in the fuel tank 13 is not purged to the atmosphere as a consequence.

Figure 2:
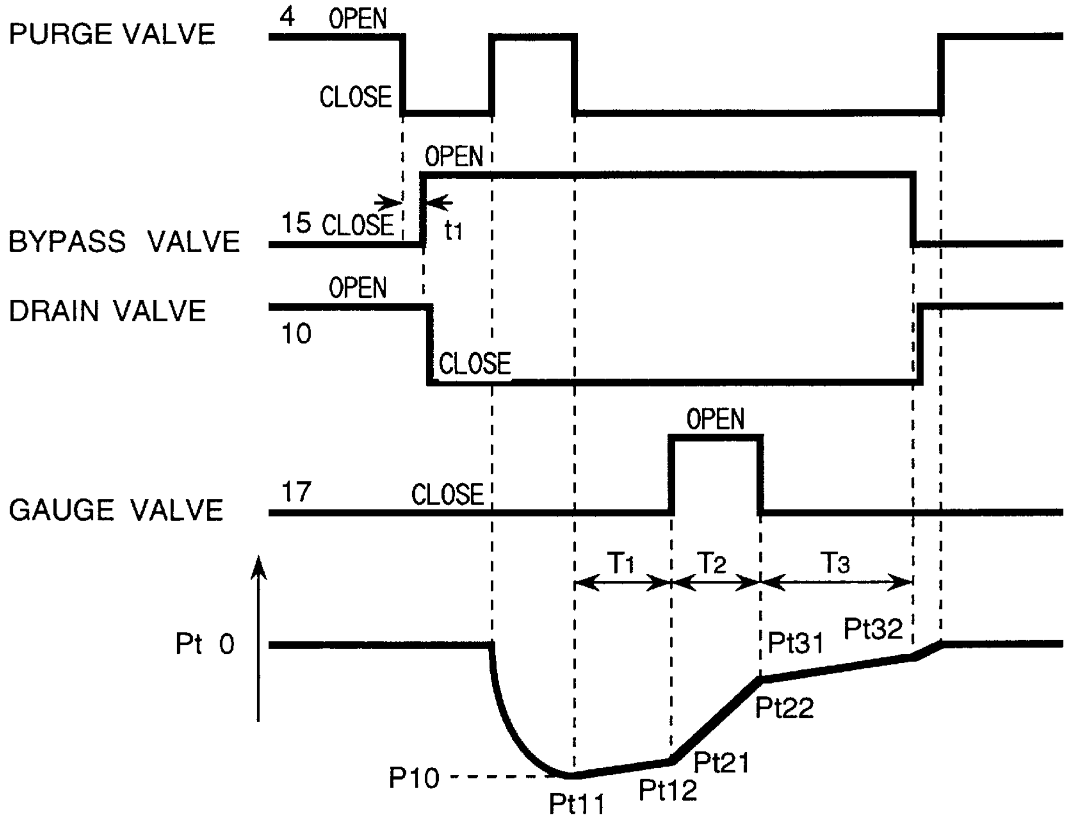
FIG. 2 is a view showing the operating timing of valves and the pressure change of the evaporation pipe of the diagnosis apparatus for the evaporation system shown in FIG. 1.

FIG. 2 shows the operating timing of valves and the pressure change in the evaporation system 20 for diagnosing the evaporation system 20.

In diagnosing the evaporation system 20, first, the purge valve 4 is once closed, the bypass valve 15 is opened, and the drain valve 10 is closed. In this stage, the evaporation system 6 including the fuel tank 13 constitutes a closed space. When the purge valve 4 is then opened, since the pressure in the intake pipe is negative pressure, the interior of the evaporation system 6 is rapidly reduced in pressure (pulled down). The pressure sensor 11 measures a pressure differential Pt relative to an atmospheric pressure Pa, and when the pressure differential Pt is below a predetermined pressure Pt0 (set to −20 to −30 mmHG), the purge valve 4 is closed and a pressure differential Pt11 is measured.

With this, since the evaporation system 20 is again sealed, the pressure is maintained constant if no leak occurs. However, when the leak is present anywhere in the evaporation system 20, the pressure gradually comes closer to the atmospheric pressure according to the magnitude of the leak. After the passage of the predetermined time T1max or when the pressure change exceeds a predetermined value (defined either when the change amount from Pt11 is a predetermined value or when the Pt itself is a predetermined value different from the Pt11. The same is true for the following.), a pressure differential Pt12 is measured. The time required at that time is stored as T1. Next, the gauge valve 17 is opened, and a pressure differential Pt21 is measured. After the passage of the predetermined time T2max or when the pressure change exceeds a predetermined value, a pressure differential Pt22 is measured, and the predetermined time is stored as T2. Next, the gauge valve 17 is closed, and a pressure differential Pt31 is measured. After the passage of the predetermined time T3max or when the pressure change exceeds a predetermined value, a pressure differential Pt32 is measured, and the predetermined time is stored as T3.

Thereafter, the bypass valve 15 is closed, the drain valve 10 is opened, and the purge valve 4 is opened (returning to the normal control state). The above-described process is carried out in the ECU 12, and the leak of the evaporation gas of the evaporation system 20 is determined on the basis of the measured values of the pressure differentials Pt11, Pt12, Pt21, Pt22, Pt31, Pt32 or the like.

It is to be noted that in the early stage of the diagnosis process, when fixed time intervals t1 is put from the closing of the purge valve 4 to the opening of the bypass valve 15, the atmospheric pressure is applied to the pressure sensor 11 through the drain valve 10, and therefore, a deviation of output of the pressure sensor 11 from the atmospheric pressure at that time (a deviation from 0 in case of the pressure differential sensor) is measured, and the measured value of the pressure after that is corrected, then an error of the pressure sensor 11 can be corrected.

Figure 3:
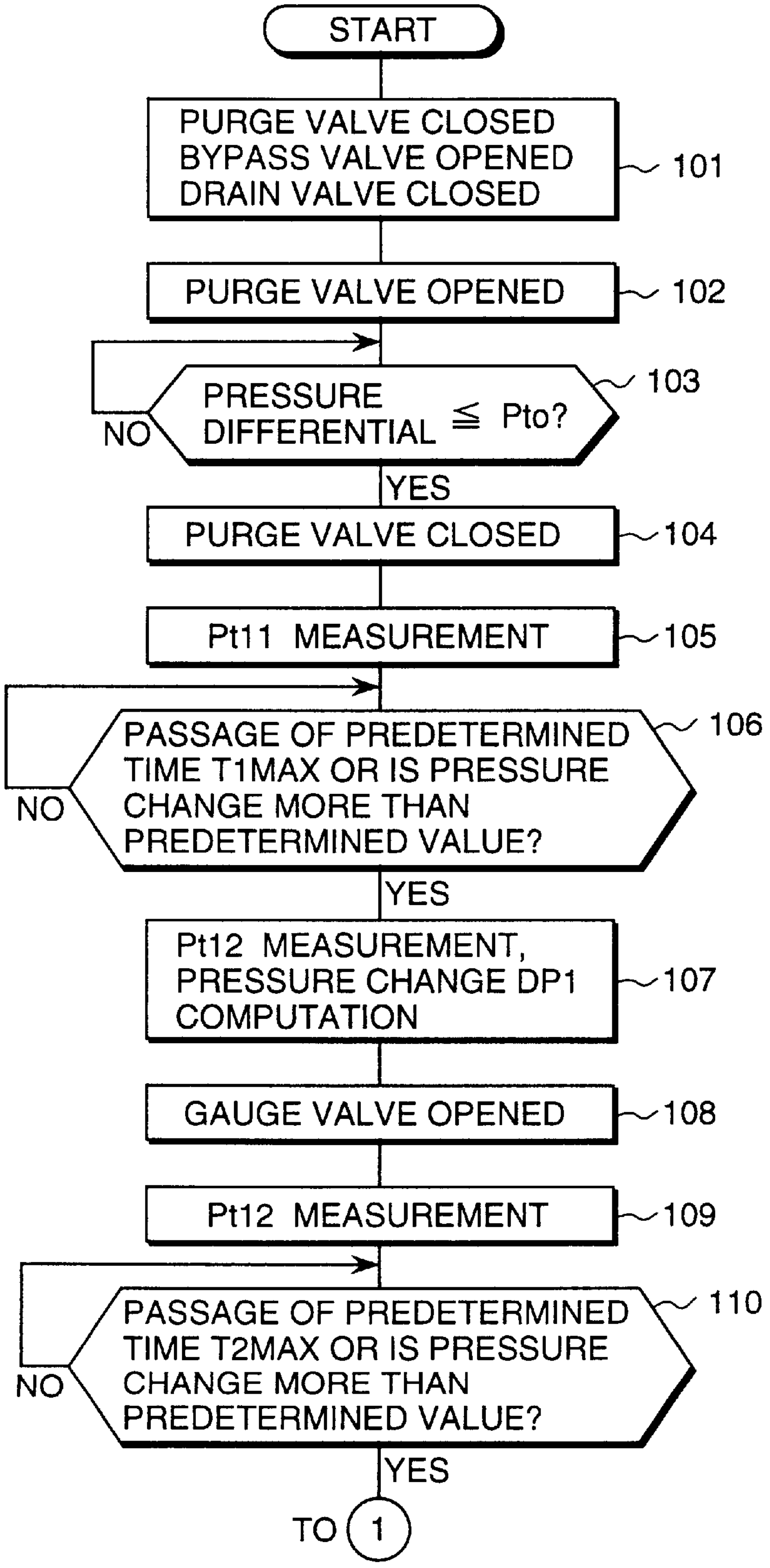
FIG. 3 is a prior-stage flowchart of the diagnosis process of the evaporation system of the diagnosis apparatus for the evaporation system shown in FIG. 1.
Figure 4:
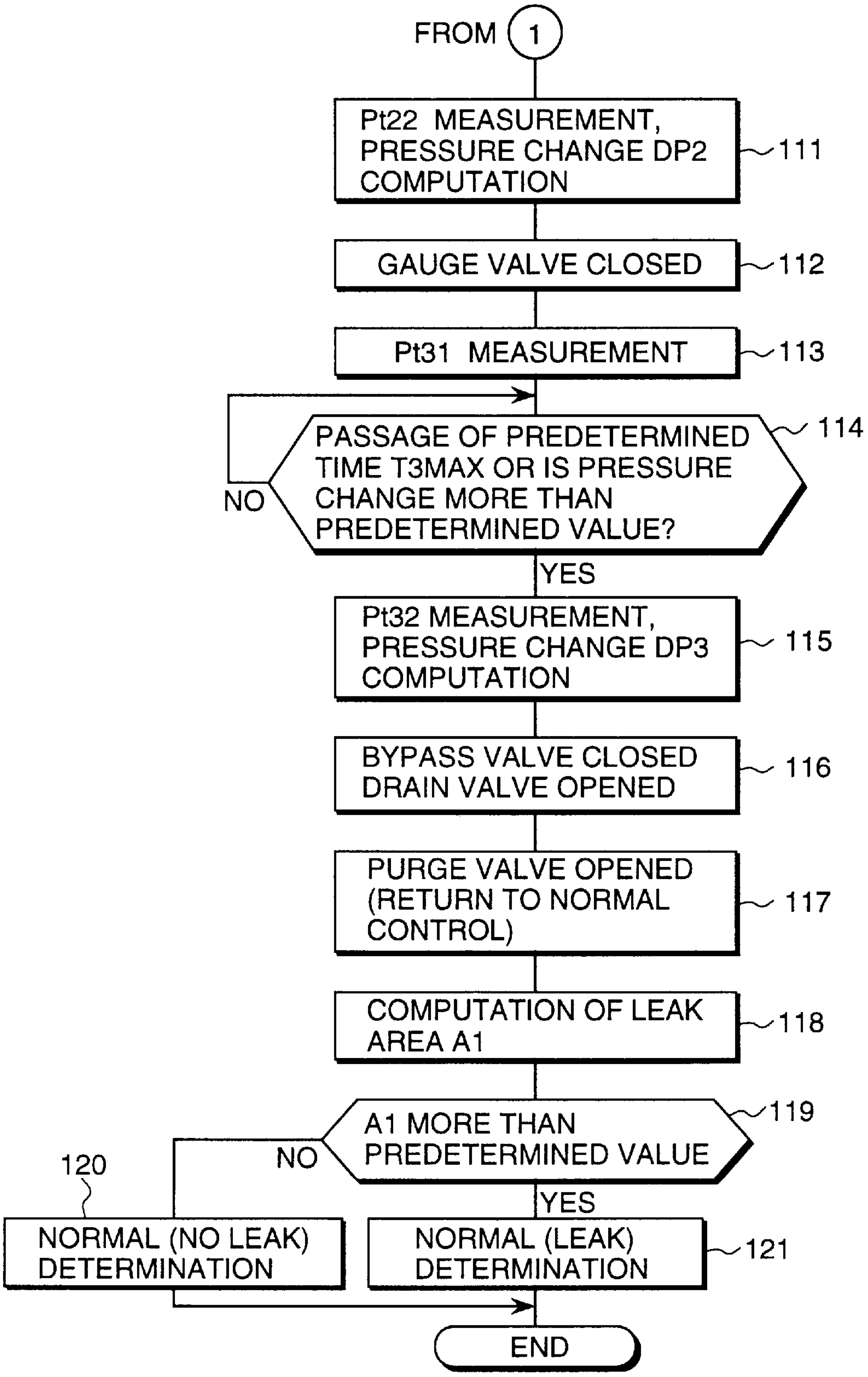
FIG. 4 is a post-stage flowchart of the diagnosis process of the evaporation system of the diagnosis apparatus for the evaporation system shown in FIG. 1.

FIGS. 3 and 4 show flowcharts when the diagnosis process is executed by the ECU 12.

In Step 101, the purge valve 4 is closed, the bypass valve 15 is opened, and the drain valve 10 is closed to place the evaporation system 20 in a closed space. The Step proceeds to Step 102. In Step 102, the purge valve 4 is opened. When the purge valve 4 is opened, the gas in the evaporation system 20 is sucked into the intake pipe 2 at negative pressure so that the interior of the evaporation system 20 is rapidly reduced in pressure.

When reaching the predetermined pressure Pt0, in Step 104, the purge valve 4 is closed, and in Step 105, the pressure Pt11 in the evaporation pipe 21 is measured. After the passage of the predetermined time or when the pressure change exceeds a predetermined value, in Step 107, the pressure Pt22 is measured, and the pressure change DP1=(Pt12−Pt11)/the required time T1 due to the leak is computed. Then, in Step 108, the gauge valve 18 is opened, and in Step 109, the pressure Pt21 is measured. After the passage of the predetermined time or when the pressure change exceeds a predetermined value, in Step 111, the pressure Pt12 is measured, and the pressure change DP2=(Pt22−Pt21)/the required time T2 due to the leak and the flow-in from the gauge orifice 19 is computed by the pressures Pt21, Pt22.

Next in Step 112, the gauge valve 17 is opened once again, and in Step 113, the pressure Pt31 is measured. After the passage of the predetermined time or when the pressure change exceeds a predetermined value, in Step 115, the pressure Pt32 is measured, and the pressure change DP3=(Pt32−Pt31)/the required time T3 due to the leak is computed by the pressures Pt31, Pt32. At this time, a program constant is so set that the pressure differential Pt is substantially 0, that is, substantially the atmospheric pressure. By doing so, the pressure differential due to the leak rarely exists, and the pressure increase due to the evaporation gas is influential. Accordingly, the pressure change DP3 represents the pressure change due to the evaporation gas. The measurement necessary for the determination of the leak of the evaporation gas is terminated by the aforementioned process. In order to return the evaporation system 20 to the normal state, in Step 116, the bypass valve 15 is closed, the drain valve 10 is opened; and in Step 117, the purge valve 4 is opened (returning to the normal control state).

A leak area A1 is obtained in accordance with operational expressions shown in Step 118 and thereafter using the above-described measured results.

First, the pressure P (absolute pressure) in the sealed evaporation system 20 is basically expressed by Equation (1), if $Pa \cong P$:

$$dP/dt=(RT/V)[A\sqrt{2\rho(Pa-P)}]+k(Ps-Pg)] \quad (1)$$

wherein A: leak area (including a sectional area of the gauge orifice 19 in the case where the gauge valve 17 is opened), R: gas constant, T: gas temperature in the evaporation system, V: volume of the evaporation system, ρ: atmospheric density, Pa: atmospheric pressure, Ps: saturated vapor pressure, Pg: partial pressure of the evaporation gas, k: evaporation rate.

The pressure differential is Pt=P−Pa. Among these, the volume V of the evaporation system is the residual amount of fuel in the fuel tank 13, the atmospheric density ρ is altitude (atmospheric pressure) or temperature, and the evaporation speed of the evaporation gas k(Ps−Pg) is a state parameter which changes according to fuel temperature of the like. The measured results such as a pressure differential for determining the leak is affected by these state parameters.

In order to eliminate the influence of these state parameters, a leak area A1 is obtained by Equation (2) from Equation (1) and the pressure differentials Pt11, Ptl2, Pt21, Pt22 and the pressure change rates DP1, DP2, Dp3 as the measured results of the above-described process. Ag is a sectional area of the gauge orifice 19.

$$A1=Ag/[(DP2-DP3)/(DP1-DP3)\sqrt{(Pt1/Pt2)}-1] \quad (2)$$

wherein Pt1=(Pt11+Pt12)/2, Pt2=(Pt21+Pt22)/2.

When the leak area A1 is in excess of a predetermined value (a leak determination threshold), determination is made in Step 121 that it is abnormal. Further, a fail safe may be carried out in accordance with an alarm to an operator, a trouble code, a memory of the operating conditions when the trouble is detected, or the predetermined process. If the leak area A1 is less than the predetermined value, determination is made in Step 120 that it is normal.

In the present embodiment, as will be apparent from comparison between Equation (2) and Equation (1), the evaporation system volume V and the atmospheric density ρ in Equation (1) are erased by Equation (2). Accordingly, it is not necessary to measure these parameters, and no addition of new measuring means for measurement will suffice. Further, the result of leak determination is not affected by an error resulting from measurement. Further, most of k(Ps−Pg) as the fuel evaporation pressure portion can be erased merely by obtaining the pressure change DP3 in the state where the pressure differential in the evaporation system 20 is substantially 0 to apply it to Equation (2).

In the above-described embodiment, the essentially important point is to measure pressure changes in the case where the gauge valve 17 is opened and in the case where it is closed in the state in which a pressure differential relative to atmospheric pressure occurs. Further, in order to detect the influence of an increase in pressure caused by the evaporation gas, the pressure change in the state in which the pressure differential relative to the atmospheric pressure rarely exists is measured.

Accordingly, the procedure for opening and closing the valves, the order and frequency of measurements are not limited to the aforementioned embodiments. Further, there is not limited to the system in which negative pressure is introduced into the evaporation system 20 for diagnosis. For example, there can be employed the system in which a pump or the like is used to pressurize for diagnosis.

The influence in the case where the stain or the like adheres to the gauge valve 17 or the like to reduce the vent area will be first mentioned. Normally, a vent area of a gauge system comprising the gauge valve 17, the gauge orifice 19 and the gauge pipe 5 is expressed by the sectional area Ag of the gauge orifice 19 (The vent area of the gauge valve 17 and the gauge pipe 5 should be set to be sufficiently large with respect to the Ag. In the case where such setting cannot be made, the equivalent vent area of the entire gauge system is Ag.).

The change of the vent area possibly occurs because the stain adheres to the gauge valve 17, the gauge orifice 19 or the gauge pipe 5 or because the gauge pipe 5 collapses. When the equivalent vent area of the entire gauge system changes for the reason described above, Ag is to change relative to the set value in Equation (2), resulting in an error in A1 as the result of diagnosis.

For example, suppose that the set value of Ag is 1 $mm^2$, and becomes 0.5 $mm^2$ due to the adhesion of stain, computation is made as Ag=1 $mm^2$ while originally computation should be made as Ag=0.5 $mm^2$, and therefore, A1 will be double of the original value.

Figure 5:
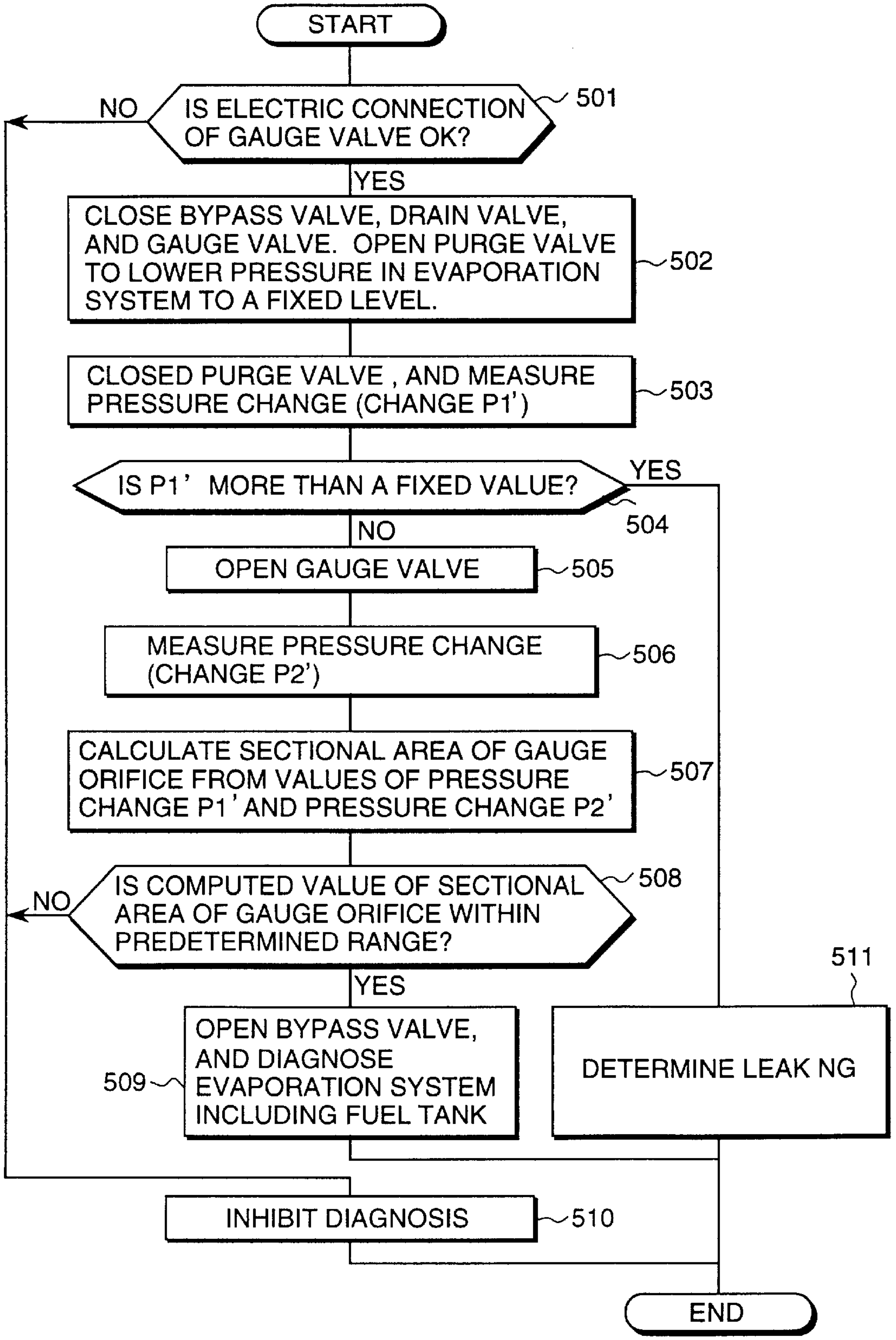
FIG. 5 is a post-stage flowchart for detecting the state of a gauge system of the diagnosis apparatus for the evaporation system shown in FIG. 1.

One example of detection means in the state where the stain or the like adheres to the gauge valve 17 or the like to reduce the vent area, as previously mentioned, will be explained with reference to a flowchart of FIG. 5.

In Step 501, the electric connection of the control system including the gauge valve 17 and the ECU 12 is detected. When in abnormal, in Step 511, the diagnosis at the evaporation system 20 is inhibited. When the electric connection is normal, in Step 502, the bypass valve 15, the drain valve 10, and the gauge valve 17 are closed and the purge valve 4 is opened to lower the pressure of the evaporation system 20 to the predetermined value (approximately −20 to −30 mmHg relative to the atmospheric pressure).

Thereafter, in Step 503, the purge valve 4 is closed, and a pressure change P1' and an average pressure P1are measured by the pressure sensor 11. In the case where determination is made in Step 504 that the pressure change P1' is in excess of the predetermined value, determination is made in Step 512 that a leak in excess of a predetermined value is present in the evaporation system 20 to determine a leak NG. In this case, the state detection of the gauge valve 17 or the like is stopped, and the diagnosis of the evaporation system 20 explained in FIGS. 2, 3 and 4 is neither started (Since the presence of the abnormality has been already determined, the succeeding diagnosis is not carried out.).

Figure 6:
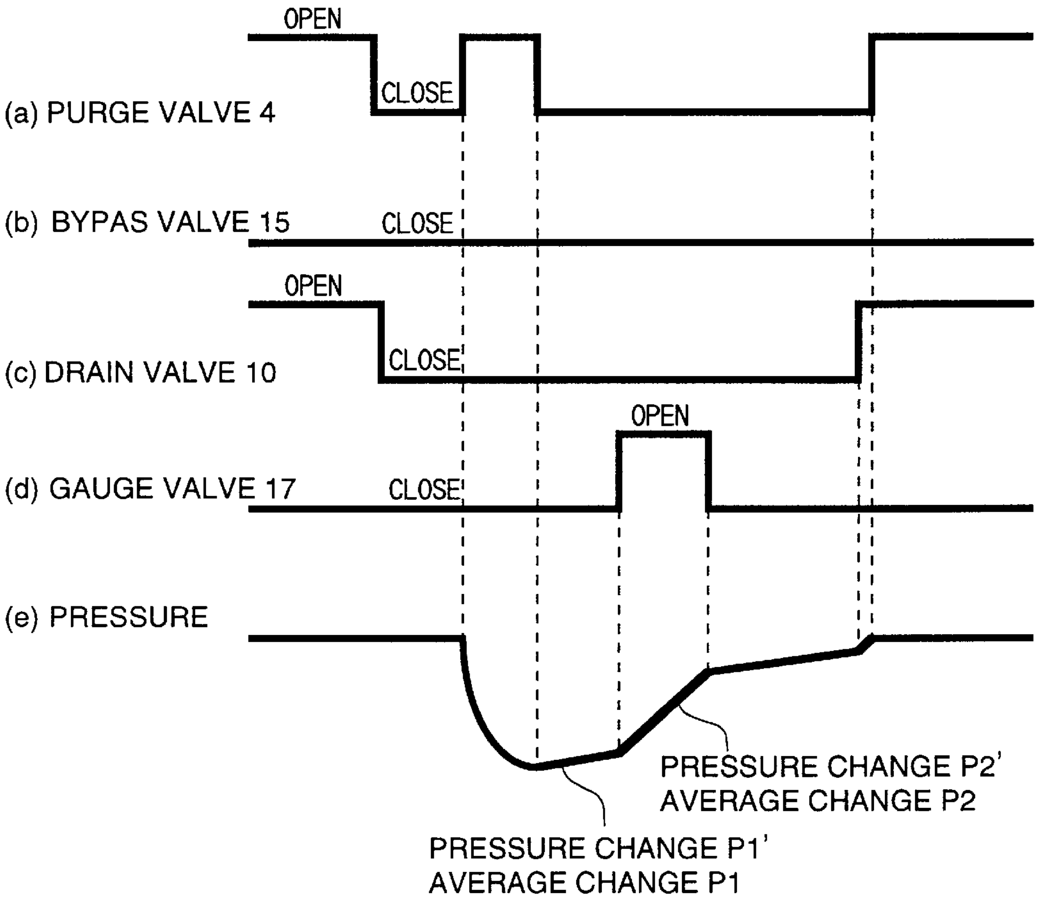
FIG. 6 is a view showing the operating timing of valves and the pressure change of the evaporation pipe for detecting the state of the gauge system of the diagnosis apparatus for the evaporation system shown in FIG. 1.

In Step 504, in the case where determination is made that P1' is less than a predetermined value, the gauge valve 17 is opened in Step 505 to measure a pressure change P2'. This situation is shown in FIG. 6. As shown in FIGS. 6(*a*), (*b*), (*c*) and (*d*), the purge valve 4, the bypass valve 15, the drain valve 10 and the gauge valve 17 are operated to measure the pressure change P1' and average pressure P1 of pressure (e), and the pressure change P2' and average pressure P2. These values are used to compute the sectional area (equivalent vent area of the entire gauge) computed value Ag' of the gauge orifice 19 in step 507 of FIG. 5. The computed value Ag' can be computed, for example, by the following Equation (3):

$$Ag'=K(P2'/\sqrt{P2}-P1'/\sqrt{P1}) \quad (3)$$

wherein K is a value decided by the volume of the canister 8, the density of the atmosphere, etc. (K is affected by the density of the atmosphere or the like. Therefore, in the case where information relating to the atmospheric pressure, the density of the atmosphere such as open-air temperature is obtained, K is calculated from these information. Then, this is more preferable. Conversely, it is possible to compute Aq' only in the case where the atmospheric pressure, the open-air temperature or the like are in the predetermined range.).

In Step 508, determination is made if the sectional area computed value Ag' of the gauge orifice computed is within the predetermined range. If within the predetermined range, in Step 509, next diagnosis (diagnosis of the evaporation system 20 described in FIGS. 2, 3 and 4) is carried out. If the sectional area computed value Ag' of the gauge orifice is large beyond the predetermined range or small, this is not suitable for the diagnosis of the evaporation system 20, and therefore, the diagnosis of the evaporation system 20 is inhibited in Step 510.

In this case, preferably, a trouble code indicative of the abnormality of the gauge system is stored in a memory of the ECU 12, or an alarm lamp for alarming the trouble to an operator is lit. If Ag' is within the predetermined range, the sectional area computed value Ag' of the gauge orifice is stored, and this flow is completed.

Next, the correction means will be explained. The sectional area computed value Ag' of the gauge orifice stored as described above is replaced by Ag' in Equation (2), and A1 is computed. Then, even in the case where the stain adheres to the gauge valve 17 or the like to reduce the vent area, a proper leak area A1 is obtained. The sectional area computed value Ag' itself of the gauge orifice is the computed value, which includes a minor error in degree of computation. Therefore, it is preferable that for example, the value having the sectional area computed value Ag' of the gauge orifice filtered is replaced by Ag.

There are other correction methods. In short, however, the correction can be made so that the smaller the sectional area computed value Ag' of the gauge orifice, the leak area A1 (obtained by Equation (2)) is small. Further, in determination of abnormality, correction is made so that the threshold compared with A1 is large when the sectional area computed value Ag' of the gauge orifice is small. Also in this case, the diagnosis whether normal or abnormal can be properly accomplished.

Next, a description will be made of the case where clogging occurs in the air cleaner 6 installed on the intake system of the engine 1. As shown in FIG. 1, in the diagnosis of the evaporation system 20, the gauge pipe 5 for the leak check is communicated with the downstream of the air cleaner 6. This is based on the consideration that the gauge pipe 5 is communicated with the downstream of the air cleaner 6 whereby the clogging of the gauge pipe caused by the dust or the like in the atmosphere is prevented, and even in the case where the trouble of defective operation in the state where the gauge valve 17 is opened occurs, the evaporation gas can be burned in the engine 1 without purging it into the atmosphere.

The portion communicated with the gauge pipe 5 should be originally kept at the atmospheric pressure for detecting the leak of the evaporation system 20. However, in the case where the clogging occurs in the air cleaner 6, there is a possibility that the intake pipe 2 at the downstream of the air cleaner 6 is negative pressure due to the vent resistance thereof, failing to perform the accurate diagnosis. For example, it is assumed that the negative pressure of 5 mmHg occurs in the portion communicated with the gauge pipe 5. Assume that in the case where the diagnosis explained in FIGS. 2 and 3 was performed, the pressure Pt in the evaporation system 20 while the gauge valve 17 is opened is 15 mmHg. Then, the pressure differential of 15 mmHg is applied to the gauge orifice 19, and Equation (2) is induced. However, actually, only the pressure differential of 15−5=10 mmHg is applied, and therefore, the flow velocity of the gas flowing through the gauge orifice 19 is smaller than that supposed. As a consequence, A1 will be the value larger than the actual value similar to the case where the stain or the like adheres to the gauge valve 17 or the like to reduce the vent area. Because of this, also in the case where the clogging occurs in the air cleaner 6, the inhibition of diagnosis and the correction of results of diagnosis are necessary.

Figure 7:
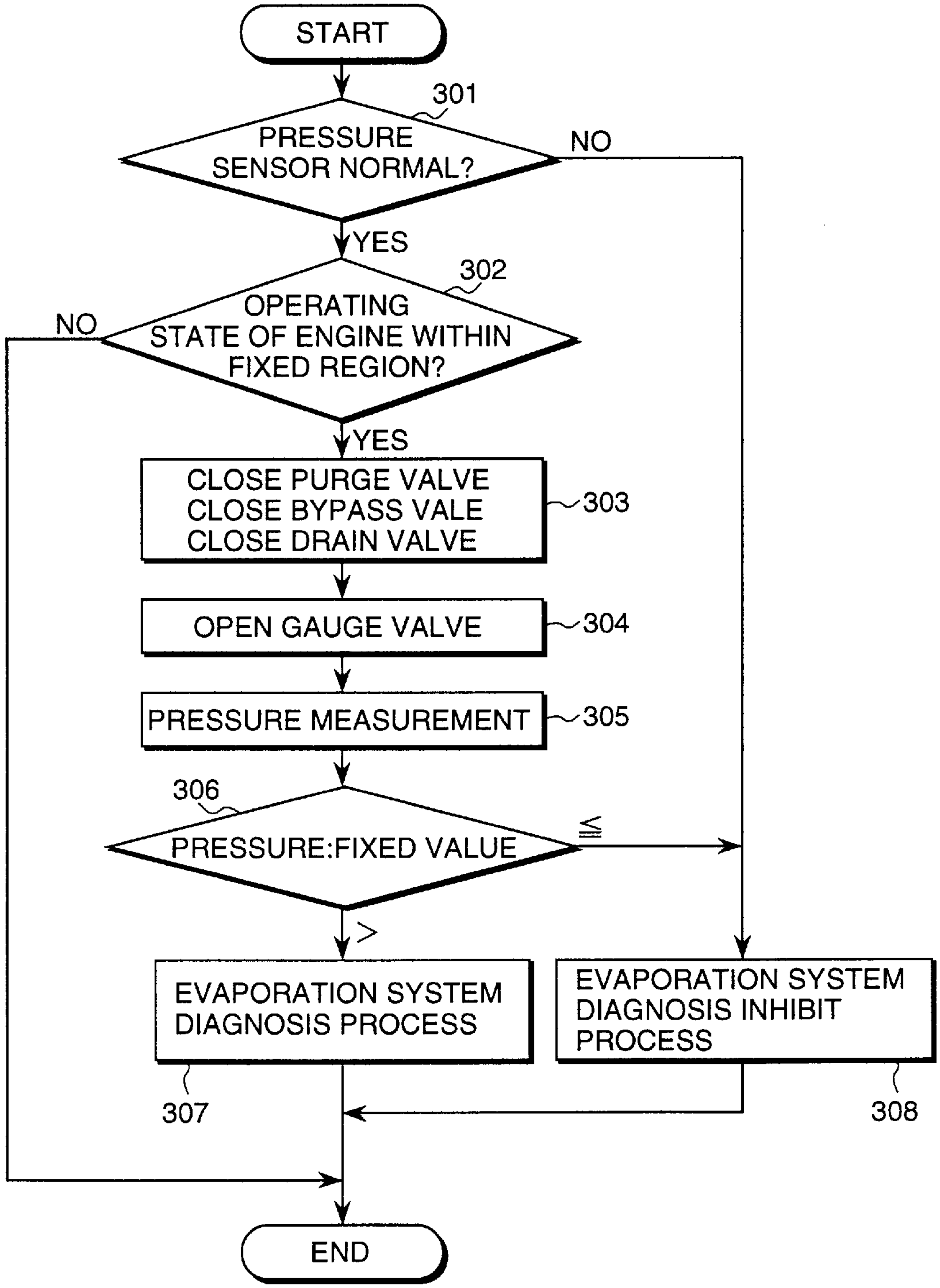
FIG. 7 is a flowchart for detecting the clogging of an air cleaner of the diagnosis apparatus for the evaporation system shown in FIG. 1.

The embodiment for detecting the occurrence of clogging in the air cleaner 6 will be explained with reference to a flowchart of FIG. 7.

First, in Step 301, determination is made if the pressure sensor 11 as the pressure detection means installed in the evaporation system 20 is normal. The checking methods of the pressure sensor 11 include the check of electrical connection (function) of a sensor output signal line (detection of short-circuiting or disconnection), the performance check by way of comparison with the pressure in the engine intake pipe under the predetermined operating conditions (the sensor detection value of the pressure in the intake pipe, or the value corresponding to the pressure in the intake pipe obtained by making use of at least two or more of engine state parameters such as the engine intake air quantity, the engine rotational frequency, the intake temperature, and the throttle opening), or the output check when in case of the relative pressure sensor, the sensing portion of the sensor within the evaporation system 20 is set to a fixed pressure (in the engine technique, generally, the atmospheric pressure or the negative pressure in the intake pipe is used).

When the pressure sensor 11 is abnormal, the procedure proceeds to Step 308, where the evaporation system diagnosis inhibition process, that is, the prevention of erroneous diagnosis resulting from the abnormality of the pressure sensor 11 and the rebound measures are executed. If the pressure sensor 11 is normal, the procedure proceeds to Step 302, where the check is carried out if the phenomenon is in an engine operating region suitable for determining the clogging state of the air cleaner 6. The operating region is determined by the magnitude or change amount of the engine state parameters such as the engine load, the rotational speed, the throttle opening and the like.

If determination is made that the phenomena is in the engine operating region suitable for checking the clogging of the air cleaner 6, the procedure proceeds to Step 303, where the valves in the evaporation system 20 are operated for determination of the clogging state of the air cleaner 6. After the purge valve 4 has been closed, the bypass valve 15 is closed, after which the drain valve 10 is closed whereby the evaporation system 20 is sealed into the atmospheric pressure state. The waiting time between the operations differs with difference of the operating state, the engine 1 and the evaporation system 20.

Next, in Step 304, the gauge valve 17 is opened. The procedure proceeds to Step 305 where pressure of the evaporation system 20 is measured. In the measurement of pressure, the magnitude of pressure or the change amount for a fixed period after the gauge valve 17 has been opened are detected.

In Step 306, the measured pressure is compared with the fixed value to determine the clogging state of the air cleaner 6. If the measured pressure is higher than the fixed value (if it is negative pressure within the fixed value with respect to the atmospheric pressure), determination is made that the air cleaner 6 has not clogging to a degree not suitable for diagnosis of the evaporation system 20 and the state where the diagnosis of the evaporation system 20 is normally carried out is present to execute the diagnosis process of the evaporation system 20 in Step 307. If the measured pressure is less than the fixed value (if its is negative pressure in excess of the fixed value with respect to the atmospheric pressure), detection is made that the air cleaner 6 has the clogging state to a degree not suitable for the diagnosis of the evaporation system 20, and in Step 308, the evaporation diagnosis inhibition process (rebound measures and abnormality alarm, etc.) is executed.

The correction means will be explained hereinafter. For example, it is assumed that the pressure value measured in Step 306 is Ptg=Pag−Pa (Pag: absolute value of measured pressure, Pa: atmospheric pressure). In the state where no clogging occurs in the air cleaner 6, Ptg is approximately 0. An equation for obtaining the leak area A1 in the case consideration is taken into the fact that Ptg is not 0 is Equation (4) below.

$$A1=kAg/[(DP2-DP3)/(DP1-DP3)\sqrt{(Pt1/Pt2)}-1] \quad (4)$$

wherein $k=\sqrt{[(Pt2-Ptg)/Pt2]}$

Accordingly, the absolute value of the measured pressure Ptg is stored, and in the computation of A1, Equation (4) may be used in place of Equation (2).

Also in this case, in short, correction may be made so that the larger the absolute value of the measured pressure Ptg, the leak area A1 (obtained by Equation (2)) is small.

Further, in determination of abnormality, even correction is made so that the threshold compared with A1 is larger when the absolute value of the measured pressure Ptg is large, the diagnosis of normality or abnormality is properly carried out.

In the case where the operating state when the absolute value of the measured pressure Ptg is measured is different from that when the diagnosis of the evaporation system 20 is carried out, there is a possibility that the negative pressure generated at downstream of the air cleaner 6 is different. In such a case, since the square of the intake air amount is in a relation substantially proportional to the generated negative pressure, it is also possible to presume the generated negative pressure from the intake air amount in the respective operating conditions. Further, with respect to the computation of the sectional area computed value Ag' of the gauge orifice, there is the influence of clogging of the air cleaner 6. Therefore, the correction is preferable.

While in the above-described explanation, the gauge pipe 5 is communicated with the downstream of the air cleaner 6, it is to be noted that the same is true for the case of opening to the atmosphere through a separate filter. In the case where the diagnosis of the evaporation system 20 is of the pressurizing system, when the negative pressure is generated in the portion communicated with the gauge pipe 5, a pressure differential in excess of a supposed value is applied to the gauge orifice 19. Therefore, the correction reversed to that previously mentioned will be made.

While one embodiment of the present invention has been explained, it is to be noted that the present invention is not limited to the aforementioned embodiment but can be variously changed in design without departing the spirit of the present invention described in claims.

While in the above-described embodiment, the detection means and correction means in the state where the stain or the like adheres to the gauge valve 17 or the like to reduce the vent area, and the detection means and correction means in the state where clogging occurs in the air cleaner 6 have been explained, the contents detected by the state detection means, the detection means and the correction means are not limited. Preferably, with respect to the contents affecting the diagnosis of the evaporation system 2, the state detection is carried out possibly, and the results of diagnosis is corrected in a sense of increasing the chance of diagnosis and further improving the accuracy of diagnosis.

In the diagnosis of the evaporation system, various states affecting the diagnosis are detected and the results of diagnosis are corrected. It is therefore possible to carry out the diagnosis with good accuracy.

What is claimed is:

1. A diagnosis apparatus for an evaporation system of an engine, comprising a fuel tank, an evaporation pipe, a canister operatively arranged to introduce evaporation gas generated in said fuel tank through said evaporation pipe and having an adsorbent for temporarily adsorbing said evaporation gas, an evaporation system comprising a purge pipe having a purge valve for purging the adsorbed evaporation gas to an intake pipe of the engine, a pressure sensor for detecting pressure in said evaporation system, a gauge pipe branched between said fuel tank and said purge valve, and opened to said intake pipe or to atmosphere, and a gauge valve arranged on said gauge pipe and a control device configured to diagnose an abnormality of the evaporation system on the basis of a pressure detection signal of said pressure sensor with said gauge valve opened or closed, said control device further comprising a state detector for detecting the state of a gauge system comprising said gauge valve and said gauge pipe, and correction means for correcting a diagnosis of an abnormality by the control device, based on a state of said gauge system detected by said state detector.

2. A diagnosis apparatus for an evaporation system of an engine, comprising a fuel tank, an evaporation pipe, a canister operatively arranged to introduce evaporation gas generated in said fuel tank through said evaporation pipe and having an adsorbent for temporarily adsorbing said evaporation gas, an evaporation system comprising a purge pipe having a purge valve for purging the adsorbed evaporation gas to an intake pipe of the engine, a pressure sensor for detecting pressure in said evaporation system, and a control device configured to determine abnormality such as leakage of the evaporation gas on the basis of a pressure detection signal of said pressure sensor, said control device further comprising a state detector for detecting the state of a gauge system comprising said gauge valve and said gauge pipe, and correction means for correcting results of diagnosis by said determined abnormality on the basis of results of detection by said state detector, wherein said state detector detects a vent area of said gauge valve.

3. A diagnosis apparatus for an evaporation system of an engine, comprising a fuel tank, an evaporation pipe, a canister operatively arranged to introduce evaporation gas generated in said fuel tank through said evaporation pipe and having an adsorbent for temporarily adsorbing said evaporation gas, an evaporation system comprising a purge pipe having a purge valve for purging the adsorbed evaporation gas to an intake pipe of the engine, a pressure sensor for detecting pressure in said evaporation system, and a control device configured to determine abnormality such as leakage of the evaporation gas on the basis of a pressure detection signal of said pressure sensor, said control device further comprising a state detector for detecting the state of a gauge system comprising said gauge valve and said gauge pipe, and correction means for correcting results of diagnosis by said determined abnormality on the basis of results of detection by said state detector, wherein said state detector detects pressure at an opening of said gauge pipe.

4. The diagnosis apparatus for an evaporation system according to claim 2, wherein said state detector detects a vent area of said gauge valve on the basis of pressure in said evaporation system corresponding to an operating state of said gauge valve.

5. The diagnosis apparatus for an evaporation system according to claim 3, wherein said state detector detects pressure at an opening of said gauge pipe on the basis of pressure in said evaporation system in an open state of said gauge valve.

6. A diagnosis apparatus for an evaporation system comprising a fuel tank, a canister for introducing evaporation gas generated in said fuel tank through an evaporation pipe and accommodating an adsorbent for temporarily adsorbing said evaporation gas, an evaporation system comprising a purge pipe having a purge valve for purging the adsorbed evaporation gas to an intake pipe of an engine, a pressure sensor for detecting pressure in said evaporation system, and a control device provided with abnormality determination means for diagnosing an abnormality of the evaporation system on the basis of a pressure detection signal of said pressure sensor, said evaporation system comprising a gauge pipe branched between said fuel tank and said purge valve and opened to said intake pipe or the atmosphere, and a gauge valve arranged on said gauge pipe, said control device comprising a state detection means for detecting the state of a gauge system comprising said gauge valve and said gauge pipe, and stopping means for stopping diagnosis by said abnormality determination means when a result of detection by said state detection means is outside a predetermined range.

* * * * *